Patented June 2, 1936

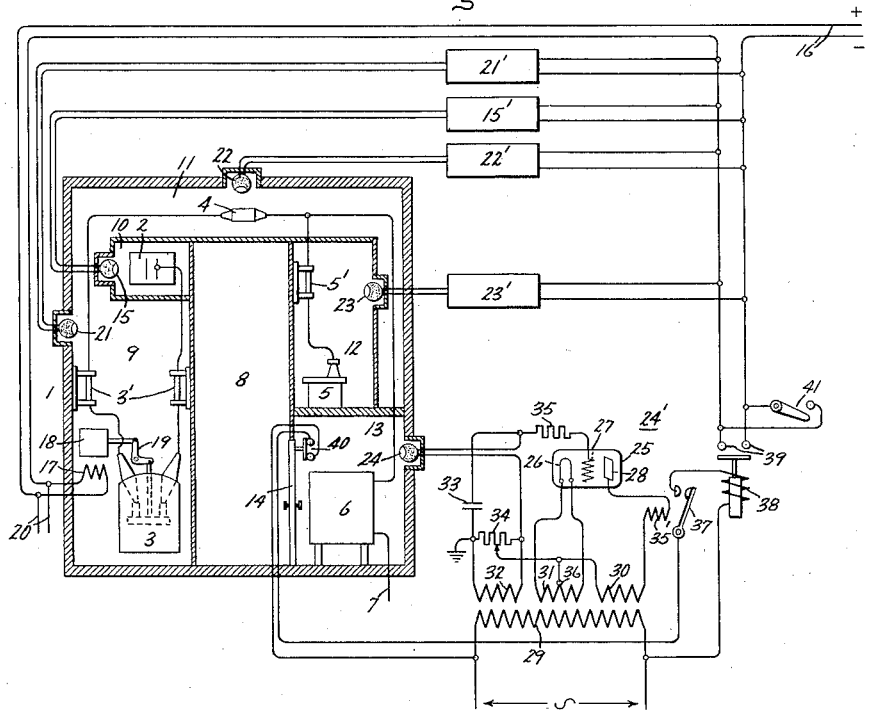

2,043,099

UNITED STATES PATENT OFFICE 2,043,099

ELECTRICAL PROTECTIVE SYSTEM

William M. Hanna, Schenectady, N. Y., assignor to General Electric Company, a corporation of New York Application October 26, 1933, Serial No. 695,288

1 Claim. (Cl. 175—294)

My invention relates to electrical protective systems, more particularly to protective systems for electrical power distribution circuits and the like, and has for its principal object the provision of an improved system for instantly detecting fault arcs and causing electrical isolation of the same.

The occurrence of a fault arc, as arcing between phases or to ground, in a bus and switch station of an electrical power distribution system, for example, necessitates immediate action in isolating or cutting off the affected part of the circuit from the remainder of the system. Timely isolation of the fault may minimize the damage and prevent the spreading of trouble throughout the bus and switch station and other parts of the system.

The use of ground fault and over-current relays and similar electro-responsive devices for detecting fault currents and isolating the affected parts of the system is well known practice. In accordance with the present invention, the fault, as evidenced by arcing, is instantly detected by a light sensitive cell which coacts with electro-responsive means so as to cause tripping of a circuit breaker, or breakers, for isolating the aforesaid fault.

My invention will be more fully set forth in the following description referring to the accompanying drawing, and the features of novelty which characterize my invention will be pointed out with particularity in the claim annexed to and forming a part of this specification.

Referring to the drawing, Fig. 1 is a partly diagrammatic illustration of a bus and switch station provided with an electrical protective system embodying the present invention, and Fig. 2 is a diagrammatic illustration of a ring bus arrangement to which, by way of example, the aforesaid protective system is applied.

Referring more particularly to Fig. 1, the bus and switch station 1 is provided with a plurality of normally closed compartments containing the high tension electrical apparatus of the station. The bus and switch station, as well known in the art, comprises part of an electrical power distribution system including the distribution busbars 2, oil circuit breaker 3 and corresponding disconnecting switches 3', current transformer 4, potential transformer 5 and corresponding disconnecting switch or fuse 5', reactor 6 and feeder or generator circuit 7.

The station as illustrated comprises a central operator's passage 8, an oil circuit breaker and disconnecting switch compartment 9, a busbar compartment 10, current transformer and cable compartment 11, potential transformer compartment 12 and a reactor compartment 13. It will be understood, of course, that the above described arrangement may be varied to a considerable extent in accordance with the operating requirements and preferred design of the station.

The aforesaid compartments housing the electrical apparatus of the station are normally closed and sealed with respect to exterior sources of light, access being had in any suitable manner as by a door 14 in the case of the reactor compartment 13.

In case of a fault arc within the station, as for example between one of the phase busbars 2 and grounded supporting or wall structure, the flash of the arc within the normally darkened busbar compartment is detected by a light sensitive cell, as a photo-electric cell 15, suitably located within the busbar compartment 10. The photo-electric cell 15 coacts with electro-responsive means 15' for closing a circuit breaker tripping circuit, the source of supply voltage for which is indicated at 16. The tripping circuit includes a tripping coil 17 which may coact in any suitable and well known manner with the tripping and operating mechanism 18 of the circuit breaker 3. The circuit breaker 3 and its operating and tripping mechanism per se form no part of the present invention and further description thereof is believed unnecessary other than to point out that operation of the bellcrank 19 effects vertical movement of the oil circuit breaker bridging member to open and close the circuit through the breaker.

Energization of the trip coil 17 from the control source 16 effects tripping and opening of the oil circuit breaker 3 in a manner well known in the art. In the event that a plurality of oil circuit breakers are to be tripped simultaneously in response to energization of the control circuit, the trip coils of such breakers may be connected in parallel with the trip coil 17 as indicated at 20.

Likewise mounted within the oil circuit breaker compartment 9, current transformer compartment 11, potential transformer compartment 12 and reactor compartment 13 are photo-electric cells 21, 22, 23 and 24, respectively, coacting with the corresponding electro-responsive means 21', 22', 23' and 24' which are each related to the oil circuit breaker tripping circuit in the manner of electro-responsive means 15'. Accordingly, a fault, as evidenced by arcing, in any one of the aforesaid compartments is instantly detected by the corresponding photo-electric cell which, through its associated electro-responsive means, causes energization of the tripping coil 17 and opening of the proper circuit breaker, or breakers, to isolate the fault in that part of the station.

The electro-responsive means 24' coacting with the photo-electric cell 24 in the reactor compartment is diagrammatically illustrated and includes an electron discharge device 25 having the usual filament or cathode 26, grid 27 and plate or anode 28. A primary transformer winding 29 energized from a suitable source of alternating current is related to secondary windings 30, 31 and 32 which energize the output, filament and control circuits, respectively, of the electron discharge device 25.

The control and output circuits associated with the electron discharge device form per se no part of the present invention, and the operation thereof is well known in the art. The photo-electric cell 24, which comprises a variable resistance when exposed to varying intensities of light, a capacitance 33 and a potentiometer 34 comprise a phase shifting bridge connected through a grid resistance 35 to the grid 27. The power output or anode-cathode circuit includes an operating coil 35', and the secondary winding 30 which is connected to the secondary winding 31 at 36.

The operation of the system is as follows: In the event of the occurrence of a fault arc within the reactor compartment 13, for example, the resistance of the photo-electric cell 24 instantly changes in response to the flash of the arc so as to change the phase relation of the grid voltage with respect to the anode voltage. As is well known, the electron discharge device 25 is effective as an asymmetrical conductor to pass unidirectional current impulses through the anode or output circuit in the event that the grid voltage is less negative than a certain critical value. When the grid voltage is more negative than the critical value no current will flow. The characteristics of the photo-electric cell circuit are such that when the compartment is dark the corresponding resistance of the cell causes the grid voltage to assume such a phase relation with respect to the anode voltage that it is more negative than the aforesaid critical value during the positive half cycles of anode voltage. Accordingly, no current flows through the output circuit including the operating coil 35'. When, however, the resistance of the photo-electric cell changes in response to the flash of an arc the phase angle of the grid voltage is changed so that the grid voltage becomes less negative than the aforesaid critical value during positive half cycles of anode voltage and current flows through the operating coil 35' effecting closing of control switch 37 and energization of relay 38 which in turn energizes the circuit breaker tripping circuit through contacts 39. It will be apparent that a plurality of photo-electric cells may be connected in parallel to the same electroresponsive device where the same breaker or group of breakers is to be tripped.

In order to prevent actuation of the circuit breaker tripping mechanism whenever the station operator opens a door admitting light to a compartment, a door switch 40 may be connected in series with the relay 38 so as to open the circuit of the relay coil when the compartment door is opened. When the compartment door is closed the switch 40 is likewise closed so that the relay 38 may be energized in the normal manner by the photo-electric cells. For manual control of the tripping means, a switch 41 is arranged to close the tripping circuit.

Where desirable, the electroresponsive apparatus associated with a photo-electric cell may control a signal circuit so that there is a visual or audible indication of the opening of one or more breakers when a flashover or fault arc occurs.

Fig. 2 diagrammatically illustrates a ring bus arrangement to which feeder and generator lines may be connected. In the present instance the ring bus 2 is sectionalized by the reactors 6 and the corresponding series and by-pass circuit breakers 6'. The feeder or generator lines 7, as the case may be, are connected as illustrated through the circuit breakers 3 to the ring bus.

If now a fault arc should occur at one of the reactors 6 for example, the photo-electric cell 24 in that portion of the reactor compartment would cause tripping of all circuit breakers which could possibly feed current into the fault. In the present instance two breakers 6' would open at opposite sides of the fault as indicated, thereby completely isolating the fault.

The circuit breakers may, of course, be operated in the usual manner by over-current relays as indicated in Fig. 2. In order to avoid complication of the drawing, the current transformer 4 is shown connected to a relay 4' for energizing a separate trip coil 43 of the circuit breaker.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:

In a bus and switch station for a high tension electric transmission and distribution system including a normally closed and darkened compartment housing high tension electrical apparatus having an opening therein and a closure for said opening and a circuit breaker for disconnecting said electrical apparatus from said system, an electrical protective system comprising a light sensitive cell mounted in said compartment so as to detect a fault at any part of said apparatus as evidenced by arcing in said compartment, electro-responsive means including a relay coacting with said light sensitive cell for causing tripping of said circuit breaker, and means rendering inoperative said relay when said closure is open.

WILLIAM M. HANNA.